Aug. 20, 1929.                H. HARZ                 1,725,137
                       VOLTAGE REGULATOR SYSTEM
                         Filed Nov. 7, 1927
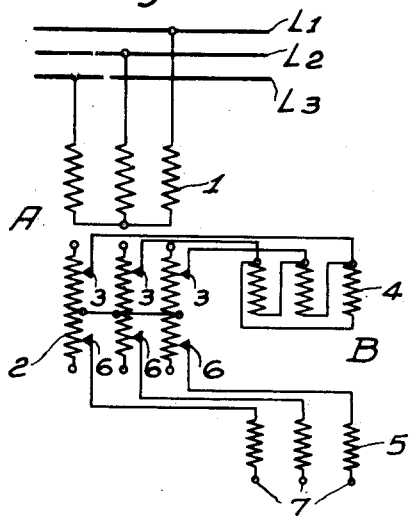
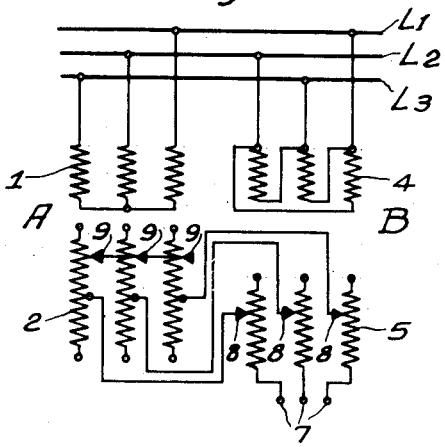
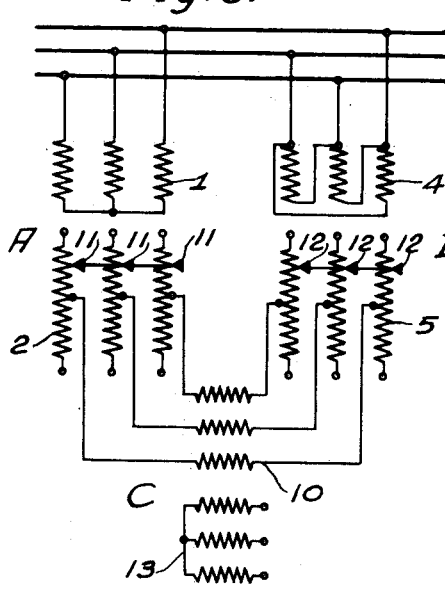
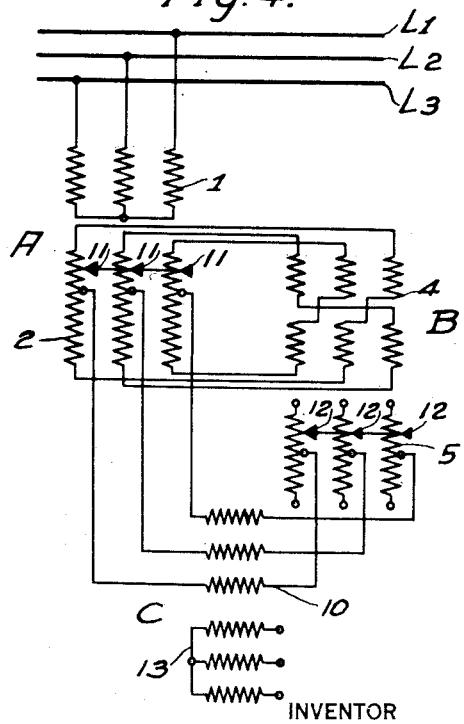
INVENTOR
Hermann Harz.
BY
ATTORNEY Patented Aug. 20, 1929.

1,725,137

UNITED STATES PATENT OFFICE.

HERMANN HARZ, OF BERLIN-SIEMENSSTADT, GERMANY, ASSIGNOR TO WESTINGHOUSE ELECTRIC & MANUFACTURING COMPANY, A CORPORATION OF PENNSYLVANIA.

VOLTAGE-REGULATOR SYSTEM.

Application filed November 7, 1927, Serial No. 231,468, and in Germany December 6, 1926.

My invention relates to a voltage control system and has particular reference to an arrangement for controlling either phase angle displacement or voltage magnitude or both, while the system is under load.

In accordance with my invention, neutral point switches adjustably coacting with the secondary windings of a plurality of multiphase transformers are utilized for controlling the voltages developed in a winding connected to said secondary windings.

My invention resides in the system, apparatus and features of construction of the character hereinafter described and claimed.

For an illustration of some of the forms my invention may take, reference is to be had to the accompanying drawing, in which:

Figure 1 is a diagrammatic view of a voltage control system,

Figs. 2, 3 and 4 are diagrammatic views of modified forms of systems.

Referring to Fig. 1, there is illustrated an electrical power system comprising the conductors $L_1$, $L_2$ and $L_3$ to which the primary winding 1 of a transformer A is connected. Coacting with the individual phases of the secondary winding 2 of transformer A are the respective movable contacts 3 to which the phases of the primary winding 4 of a transformer B are respectively connected. Connected to the individual phases of the secondary winding 5 of transformer B are conductors terminating, respectively, in movable contacts 6 which coact, respectively, with the individual phases of the secondary winding 2 of transformer A.

In order that the primary winding 4 may generate a voltage in the cooperating secondary winding 5 which shall be displaced by 90 degrees with respect to the voltage induced in the secondary winding 2, said winding 4 is connected in delta and the connections thereof are interchanged. Since the winding 5 is open and connected to the secondary winding 2 as described above, a voltage is obtained from the terminals 7 of said winding 5 which is displaced by 90 degrees from the voltage induced therein. The winding 2 is open so that the voltage may be regulated in value as well as in direction, and the neutral point of the three phases, preferably is located in the middle of each phase. The two voltages located at right angles to each other may be regulated independently of each other by moving the contacts 3 and 6.

The arrangement illustrated in Fig. 2 differs from that of Fig. 1 in that the primary winding 4 of transformer B is energized from the line and not by the secondary winding 2 of transformer A. The mid-points of the individual phases of the winding 2 of transformer A are connected through movable contacts 8 to the secondary winding 5 of transformer B and the neutral points 9 of the winding 2 of transformer A constitute a movable switch.

The operation of the arrangement illustrated in Fig. 2 is substantially the same as with the device of Fig. 1. One of the two voltages extending at right angles to each other is regulated by moving the contacts 9 while the second voltage is adjusted by movement of the contacts 8.

With the arrangement illustrated in Fig. 1, two step switches 3 and 6 are required for adjustment of the phase voltage, while in Fig. 2 but one switch of this character is utilized. Furthermore, with the system illustrated in Fig. 1, large short circuit currents may be generated in the primary winding 4 of transformer B when the contact members 3 are at zero, that is, when the primary winding 4 of transformer B is short circuited and the regulating contact members 6 are energized. Furthermore, the flux traversing the secondary winding 5 of transformer B also traverses the primary winding 4 of that transformer and generates short circuit current.

In accordance with my invention, in lieu of the step switches illustrated in Figs. 1 and 2, there are utilized in Fig. 3 a plurality of neutral point step switches. With the form of my invention illustrated in Fig. 3, the primary winding 1 of the transformer A is again connected in star to the line, while the primary winding 4 of the transformer B is connected in delta and the connections to the line are cyclically interchanged. The secondary windings 2 and 5 of the respective transformers A and B are left open and are connected in series with the primary winding 10 of a third transformer C; the aforesaid secondary windings 2 and 5 are also provided, respectively, with movable neutral point switches 11 and 12.

In operation, the two windings 2 and 5 introduce into the primary winding 10 two voltages extending at right angles to each other and the values and directions of these voltages depend upon the positions of the two neutral point switches 11 and 12. The aforesaid displaced voltages induce correspondingly displaced voltages in the secondary winding 13 of transformer C which is connected to an energy-translating device not shown.

In those cases where a transformer A or B is of small capacity, it becomes difficult to connect a delta winding to a high voltage source. Under such circumstances there may be utilized an arrangement of the character illustrated in Fig. 4, wherein the primary winding 4 of transformer B is open and zigzag. This is the equivalent of a delta connected winding as regards phase displacement. The terminals of the primary winding 4 are connected to the open secondary winding 2 of transformer A in the manner illustrated.

With the arrangement of Fig. 4, the primary winding 10 of transformer C is connected to the secondary windings 2 and 5 of transformers A and B in the manner described above with respect to Fig. 3.- Similarly, the said secondary windings 2 and 5 are provided with the movable neutral point switches 11 and 12.

I claim as my invention:

1. The combination with a plurality of multi-phase transformers comprising a system having a winding connected to the secondary windings of a plurality of said transformers, of a neutral point switch adjustably coacting with the phases of one of said secondary windings for varying the voltages of the phases of said winding extending at right angles to the voltages introduced therein by another of said secondary windings.

2. The combination with a plurality of multi-phase transformers comprising a system having a winding connected to the secondary windings of a plurality of said transformers, of neutral point switches adjustably coacting, respectively, with the phases of said secondary windings for varying the voltage of the phases of said winding.

3. The combination with a plurality of multi-phase transformers comprising a system having the primary winding of one transformer connected to the secondary windings of a plurality of other transformers, of means for varying the voltages introduced in the phases of said primary winding, and means comprising a neutral point switch coacting with one of said secondary windings for varying the respective voltages extending at right angles to said first named voltages.

4. The combination with a plurality of multi-phase transformers comprising a system having the primary winding of one transformer connected to the secondary windings of a plurality of other transformers, of means comprising a neutral point switch coacting with one of said secondary windings for varying the voltages introduced in the phases of said primary winding, and means comprising a second neutral point switch coacting with another of said secondary windings for varying the respective voltages extending at right angles to said first named voltages.

5. The combination with a plurality of multi-phase transformers comprising a system having the primary winding of one transformer connected to the open secondary windings of a plurality of other transformers, of means comprising a neutral point switch coacting with one of said secondary windings for varying the voltages introduced in the phases of said primary winding, and means comprising a second neutral point switch coacting with another of said secondary windings for varying the respective voltages extending at right angles to said first named voltages.

6. The combination with a plurality of multi-phase transformers comprising a system having the primary winding of one transformer connected to the mid-points of the open secondary windings of a plurality of other transformers, of means comprising a neutral point switch coacting with one of said secondary windings for varying the voltages introduced in the phases of said primary winding, and means comprising a second neutral point switch coacting with another of said secondary windings for varying the respective voltages extending at right angles to said first named voltages.

In testimony whereof, I have hereunto subscribed my name this twenty-eighth day of July, 1927.

HERMANN HARZ.